United States Patent Office 3,514,457
Patented May 26, 1970

3,514,457
PROCESS FOR THE PREPARATION OF FLUORINDINE DERIVATIVES
Charles Edward Osborne and Eugene Ransom Shelton, Kingsport, Tenn., assignors to Eastman Kodak Company, Rochester, N.Y., a corporation of New Jersey
No Drawing. Continuation-in-part of application Ser. No. 504,148, Oct. 23, 1965. This application Feb. 8, 1967, Ser. No. 614,573
Int. Cl. C07d 51/80
U.S. Cl. 260—267          10 Claims

ABSTRACT OF THE DISCLOSURE

Preparation of 5,12-dialkylfluorindines by reacting an o-phenylenediamine with a p-benzoquinone and subsequently treating the intermediate thus formed with an acid.

---

This application is a continuation of our co-pending application Ser. No. 504,148 filed Oct. 23, 1965, now abandoned.

This invention relates to a novel process for the preparation of 5,12-dialkylfluorindines which are useful as dyes for polyacrylonitrile textile fibers, yarns and fabrics.

The process of the invention comprises reacting an o-phenylenediamine having the formula

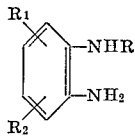

with p-benzoquinone to form a 2,5-dianilino-p-benzoquinone and contacting the 2,5-dianilino-p-benzoquinone with an acid catalyst until ring closure is effected to obtain a 5,12-dialkylfluorindine having the formula

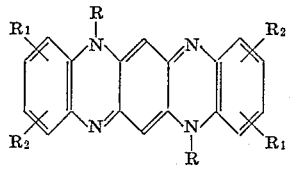

wherein R represents an alkyl group, $R_1$ and $R_2$ are the same or different and each represents hydrogen, an alkyl group, an alkoxy group, a lower alkylsulfonyl group, halogen, hydroxyl, nitro, cyano, a sulfamoyl group, a carbamoyl group, or a lower alkylsulfonamido group or, when taken collectively with the carbon atoms to which they are attached, $R_1$ and $R_2$ represent a benzo group.

The compounds prepared in accordance with the invention are useful as dyes on acrylic and modacrylic textile materials and when applied thereto according to well-known methods, the compounds give blue dyeings having excellent fastness properties.

The reactions which take place during the process of our invention can be represented by the following equations:

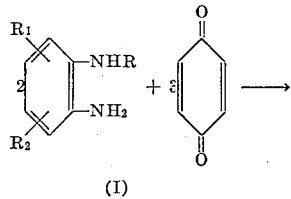
(I)

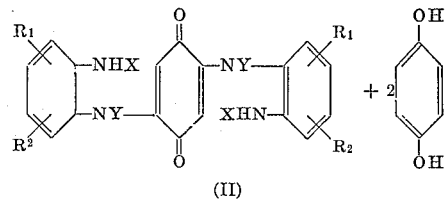
(II)

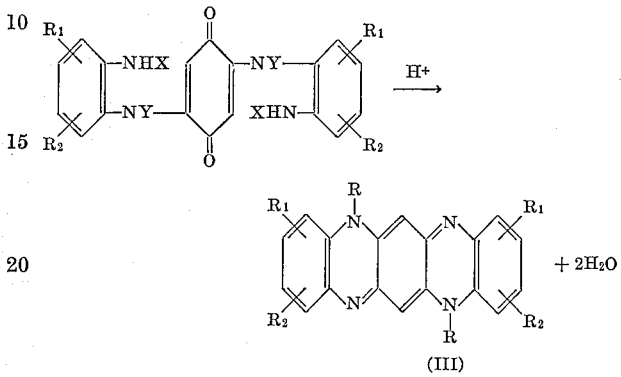
(III)

In the formulae in the preceding equations X and Y are different and are hydrogen or the substituent R. Thus, when X is hydrogen, Y is R; and, when X is R, Y is hydrogen. The substituents R, $R_1$, and $R_2$ are as defined hereinbefore and hereinafter.

In the general formulae set forth above, R represents an alkyl group which can be straight or branch chain, substituted or unsubstituted having up to about 12 carbon atoms. Examples of the unsubstituted alkyl groups represented by R are methyl, ethyl, propyl, isopropyl, butyl, isobutyl, hexyl, 2-ethylhexyl, octyl, dodecyl, etc. Examples of this substituted alkyl groups represented by R are hydroxyalkyl, e.g. 2-hydroxyethyl; haloalkyl, e.g. 2-bromoethyl, 3-chloroethyl; cyanoalkyl, 2-cyanoethyl, lower alkylaminoalkyl, e.g. 3-dimethylaminopropyl, etc. Preferably, R represents a lower alkyl group, especially unsubstituted lower alkyl.

The alkyl groups represented by $R_1$ and $R_2$ can contain up to 12 carbon atoms and can be unsubstituted or substituted straight or branch chain such as, for example, methyl, ethyl, propyl, isopropyl, butyl, hexyl, haloalkyl, e.g. 2-chloroethyl, 3-bromopropyl, trifluoromethyl, hydroxyalkyl, e.g. 2-hydroxyethyl, 2,3-dihydroxyethyl, etc. Preferably, the alkyl groups represented by $R_1$ and $R_2$ are lower alkyl, e.g. up to about 4 carbon atoms. The alkoxy groups represented by $R_1$ and $R_2$ can similarly contain up to 12 carbon atoms which can be straight or branch chain. Preferred alkoxy groups are those containing up to about 4 carbon atoms, i.e. lower alkoxy, such as methoxy, ethoxy, propoxy, butoxy, etc. Examples of the lower alkylsulfonyl groups represented by $R_1$ and $R_2$ are methylsulfonyl, ethylsulfonyl, butylsulfonyl. Bromine and chlorine are typical of the halogens which $R_1$ and $R_2$ can represent. Illustrative of the sulfamoyl and carbamoyl groups represented by $R_1$ and $R_2$ are sulfamoyl, N-lower alkyl substituted sulfamoyl, e.g. N-ethylsulfamoyl, N,N-dimethylsulfamoyl, carbamoyl, N-lower alkyl substituted carbamoyl, e.g. N-methylcarbamoyl, N,N-dipropylcarbamoyl, etc. Methylsulfonamido, ethylsulfonamido and butylsulfonamido are typical lower alkylsulfonamido groups represented by $R_1$ and $R_2$.

When taken collectively, $R_1$ and $R_2$ can also represent a benzo group fused to the aromatic ring to which $R_1$ and $R_2$ are attached. The benzo ring which $R_1$ and $R_2$ can represent can joint the fluorindine nucleus at the 1 and 2 and the 8 and 9 positions, at the 2 and 3 and the 9 and 10 positions, or at the 3 and 4 and the 10 and 11 positions.

When the process of the invention is carried out using a single o-phenylenediamine of Formula I, symmetrical 5,12-dialkylfluorindines are obtained. When two different o-phenylenediamines are used, i.e. the groups represented by R, $R_1$ and $R_2$ on one o-phenylenediamine are not the same as on the other phenylenediamine, unsymmetrical 5,12-dialkylfluorindines are obtained. For example, 5-methyl-12-ethylfluorindine is obtained by using N-methylphenylenediamine with N-ethylphenylenediamine, or when N-butylphenylenediamine is used with 1-methylamino-5-methylaniline there is obtained 5 - butyl-9,12-dimethylfluorindine. Generally, when two different o-phenylenediamines are used, the 5,12-dialkylfluorindine product consists of a mixture of symmetrical and unsymmetrical compounds.

The reaction of the o-phenylenediamine and benzoquinone can be carried out at a temperature of about $-20°$ to about 85° C., preferred reaction temperatures being in the range of about 0° to about 30° C. The initial reaction between the o-phenylenediamine and p-benzoquinone is exothermic and should be cooled to maintain the temperature in the desired range if best results are to be obtained. An inert solvent is employed in this step of the process of the invention. Illustrative of the inert solvents that are useful are the dioxanes, aliphatic diethers, e.g. 1,2-dimethoxyethane and alcohols which are liquid at the reaction temperature. Generally, the alcohols useful in the process can contain up to about 10 carbon atoms such as, for example, methanol, ethanol, propanol, isopropyl alcohol, amyl alcohol hexyl alcohol, octyl alcohol, decyl alcohol, etc. Preferred inert solvents are the alcohols which contain up to about 3 carbon atoms. The molar proportion of the alkylphenylenediamine compound to p-benzoquinone in initial reaction mixture can be varied between about 1:1.375 and 1:2.5. Best results are obtained when the molar proportion of the reactant is about 1:1.5.

The product of the reaction described immediately above, i.e. compound (II), can be isolated prior to the effecting ring closure. More conveniently, the reaction mixture containing compound (II) can be treated with acid to form the fluorindine product, i.e. compound (III), without isolating the intermediate.

When compound (II) is converted into compound (III), the particular acid catalyst used is not important. The acids found to be useful encompass the strong inorganic acids to the relatively weak organic acids. Examples of the inorganic acids and derivatives thereof are hydrochloric acid, sulfuric acid, the alkyl acid sulfate esters, e.g. methyl acid sulfate, ethyl acid sulfate, and butyl acid sulfate, phosphoric acid, the monoalkyl phosphate esters, e.g. monomethyl phosphate, monoethylphosphate, the phosphonic acids, e.g. phenylphosphonic acid, meta phosphoric acid, pyrophosphoric acid, etc. Examples of organic acids include the carboxylic acid having up to about 18 carbon atoms. Examples of such acids are acetic, propionic, butyric, caproic, palmitic, stearic and benzoic acid. Halogenated carboxylic acids, such as trichloroacetic acid, are also useful. The process of our invention will also yield the desired product when phenol is used as the acid. In general, any acid having a pKa of less than 10, i.e. an acidity or ionization constant of greater than about $10^{-10}$, is operable in the process of our invention. The stronger acids such as sulfuric acid, hydrochloric acid, acetic acid, etc., are preferred since better yields from shorter reaction times can be obtained with such acids.

An inert solvent is usually employed in the ring closing process. However, when a liquid acid is used in the process, an inert solvent is not required since the liquid acid itself can functon as the solvent. Examples of such liquid acids are the lower carboxylic acids. Preferably, the solvent is an alcohol such as described above for the process of preparing the intermediate. Alcohols having up to about 10 carbon atoms are useful, preferred alcohols solvents being those containing up to about 3 carbon atoms, e.g. methyl alcohol, ethyl alcohol, propyl alcohol and isopropyl alcohol. When the intermediate 2,5-dianilino-p-benzoquinone is not isolated after its preparation as described above, additional solvent is not required since sufficient solvent is present from the process of preparing intermediate.

The temperature at which the ring closing process is carried out can be varied over a wide range, depending upon the solvent employed. We have found tha the process can be successfully operated to effect ring closure at temperatures of about $-20°$ to about 200° C. Preferably the process is carried out at a temperature of about 60° to about 120° C.

The catalytic amount of acid that can be used in the ring closing process can be varied over a wide range. It has been found that amounts of acid as low as or lower than 5% of the acid equivalent to the starting o-phenylenediamine give satisfactory yields of product. In order to obtain maximum yields of product which can conveniently be isolated, it is preferred that an excess of acid, based on the equivalency of the acid employed and the starting o-pheneylenediamine, be used in the process. Excesses of about 150% to about 500%, on the basis of equivalency as mentioned, give excellent results with excesses of about 200% being particularly advantageous. When the acid utilized, e.g. acetic acid, also functions as the solvent, such acid can be present in excesses as high as 100 equivalents of acid to 1 equivalent of the starting o-phenylenediamine.

Both steps of the process of the invention can be conducted under pressures moderately above or below atmospheric pressure although, for reasons of convenience, it is preferred that the process be carried out at atmospheric pressure.

The following examples will serve to illustrate our invention.

EXAMPLE 1

To a solution of 136 g. (1.00 mole) N-ethyl-o-phenylenediamine in 400 ml. methanol cooled to 0–3° C. was added 162 g. (1.50 moles) p-benzoquinone in three equal portions, maintaining the temperature at 0–3° C. The mixture was stirred for an additional 21 hours at 0–3° C., and then 400 g. of 50% aqueous sulfuric acid was added. The reaction mixture was refluxed (77° C.) for two hours, cooled to 3° C. and filtered. The wet filter cake was added to a mixture of 400 ml. of methanol and 400 g. of 50% sulfuric acid, which was heated to 70° C., cooled to 3° C. and filtered. The cake was washed with a mixture of 50 ml. methanol and 50 g. of 50% aqueous sulfuric acid. The cake was slurried in 600 ml. of water, and aqueous ammonia was added until the pH was 8–9. The solid was filtered off, washed with four 100 ml. portions of dilute aqueous ammonia (pH 8–9) and dried to give 69.0 g. of 5,12-dihydro-5,12-diethylquinoxalo[2,3-b] phenazine (5,12-diethylfluorindine) assaying 92.4%, a 37.5% assay yield.

EXAMPLE 2

To a solution of 204 g. (1.50 moles) N-ethyl-o-phenylenediamine in 600 ml. methanol at 0–4° C. was added 243 g. (2.25 moles) p-benzoquinone in three equal portions. The mixture was stirred for 30 minutes at 0–4° C. after each addition and then for 24 hours at 0° C. The mixture was filtered at 0° C., and the cake was washed with 50 ml. methanol and dried to give 170 g. of material. Twenty grams of this intermediate was added to 200 g. of 40% sulfuric acid. The mixture was refluxed for five hours, cooled to 5° C., and filtered. The cake was slurried in 300 ml. water, and the pH was adjusted to 8–9 with aqueous ammonia. The product was filtered off, washed with dilute aqueous ammonia (pH 8–9) and dried to give 13.5 g. of 5,12-dihydro-5,12-diethylquinoxalo [2,3-b] phenazine assaying 77.0%, 35% assay yield based on p-benzoquinone. A similar treatment of the intermediate with 50% aqueous sulfuric acid gave a 34% assay yield of product assaying 80%.

EXAMPLE 3

A mixture of 40 ml. methanol and 13.6 g. (0.10 mole) N-ethyl-o-phenylenediamine was cooled to 0° C., and 16.2 g. (0.15 mole) p-benzoquinone was added in three equal portions at 0–3° C. The mixture was stirred for 30 minutes between each addition and for 21 hours at 0–3° C. after the final addition. Then 40 g. of 50% aqueous sulfuric acid was added, and the reaction mixture was stirred for 24 hours at 20–24° C. Thin layer chromatographic (TLC) analysis after 3 hours showed a large amount of unreacted starting material, but a much smaller amount after 20 hours. The mixture was cooled to 5° C. and filtered. The precipitate was washed with a mixture of 20 ml. methanol and 20 g. 50% aqueous sulfuric acid. It was then slurried in a mixture of 40 ml. methanol and 40 g. 50% aqueous sulfuric acid at 5° C. and filtered. The filter cake was slurried in water, 28% aqueous ammonia was added to give a pH of 8–9, and the slurry filtered. The filter cake was dried to 8.5 g. 5,12-dihydro-5,12-diethylquinoxalo [2,3-b] phenazine assaying 75.3%, which is a 37.7% assay yield.

EXAMPLE 4

A run was made exactly as Example 3, but the mixture was stirred for 21 hours at 0–3° C. after addition of the sulfuric acid rather than 24 hours at 20–24° C. The yield of product assaying 76.8% was 8.3 g., which is a 37.5% assay yield.

EXAMPLE 5

To a solution of 136 g. (1.0 mole) N-ethyl-o-phenylenediamine in 400 ml. methanol was added 162 g. (1.5 moles) p-benzoquinone over a period of two hours at 0–3° C. The mixture was stirred for two hours longer at 0–3° C. and filtered. The cake was washed with 50 ml. methanol and dried to give 86 g. of intermediate product. Eighty grams of this intermediate was refluxed with 800 g. 38% hydrochloric acid for four hours. The mixture was cooled to 5° C. and filtered. The cake was slurried in dilute aqueous ammonia, filtered, washed with dilute aqueous ammonia and dried to give 65.5 g. of 5,12-dihydro-5,12-diethylquinoxalo [2,3-b] phenazine assaying 83%, an overall assay yield of 34% based on p-benzoquinone.

EXAMPLE 6

To a solution of 136 g. (1.0 mole) N-ethyl-o-phenylenediamine in 400 ml. methanol was added 162 g. (1.5 moles) p-benzoquinone over a period of 1.5 hours at 25–30° C. The mixture was stirred for 18 hours at 25–30° C., cooled to 5° C. and filtered. The cake was washed once with cold methanol, reslurried in 10% aqueous ammonia, filtered, washed with dilute aqueous ammonia and then with water, and dried to give 74.5 g. of intermediate. Twenty grams of this intermediate was refluxed in acetic acid for 45 minutes. The mixture was cooled to 60° C. and added to a mixture of 400 ml. ice and water and 260 ml. 28% aqueous ammonia. The precipitate was filtered off, washed with dilute aqueous ammonia and dried to give 4.7 g. 5,12-dihydro-5,12-diethylquinoxalo [2,3-b] phenazine assaying 78.5% which is a 30% assay yield based on p-benzoquinone.

EXAMPLE 7

A mixture of 40 ml. methanol and 13.6 g. (0.10 mole) N-ethyl-o-phenylenediamine was cooled to 0° C. and 16.2 g. (0.15 mole) of p-benzoquinone was added in three equal portions at 0–3° C. The mixture was stirred for 30 minutes between additions and for 21 hours at 0–3° C. after the final addition. Then 100 g. phenol was added, and the mixture was refluxed (76° C.) for 24 hours. TLC analysis after 8 hours showed a large amount of starting material left, with much less after 24 hours. The reaction mixture was added to 400 ml. water, and 100 ml. 28% aqueous ammonia was added. The precipitate was a mobile tar which contained both starting material and product by TLC analysis. The aqueous layer was decanted off the tar, and a mixture of 100 ml. methanol and 100 g. 50% aqueous sulfuric acid previously cooled to 5° C. was added to the tar. The mixture was stirred for 10 minutes at 5° C., and the resulting crystalline material was slurried in a mixture of 25 ml. methanol and 25 g. 50% aqueous sulfuric acid at 5° C. and filtered. The precipitate was slurried in aqueous ammonia, filtered, washed with aqueous ammonia, and dried to give 4.7 g. 5,12-dihydro-5,12-diethylquinoxalo [2,3-b] phenazine assaying 88.8%, which is a 24.5% assay yield.

EXAMPLE 8

The product obtained in the above examples can be further purified using the following technique.

Twenty grams of 5,12-dihydro-5,12-diethylquinoxalo-[2,3-b]phenazine assaying 67.2% was slurried in 80 ml. methanol and 80 g. of 50% aqueous sulfuric acid was added. The mixture was heated to 70° C., and cooled to 5° C. and filtered. The cake was slurried in 300 ml. water, and the pH was adjusted to 8–9 with aqueous ammonia. The solid was filtered off, washed with dilute ammonia and dried to give 15.4 g. of 5,12-dihydro-5,12-diethylquinoxalo[2,3-b]phenazine assaying 87% which is a 99% recovery based on assay.

EXAMPLE 9

To a solution of 13.6 g. (0.10 mole) N-ethyl-o-phenylenediamine in 40 ml. methanol cooled to 0° C. was added 16.2 g. (0.15 mole) p-benzoquinone in three equal portions. The mixture was stirred 30 minutes between additions and then for 22 hours at 0–3° C. after the final addition. Then a solution of 4.55 g. (0.044 mole) 97% sulfuric acid in 35 g. water was added, and the mixture was refluxed for four hours. The mixture was cooled to 0° C. and the precipitate was filtered off and slurried in a mixture of 30 g. methanol and 30 g. sulfuric acid at 0–5° C. for 15 minutes. The precipitate was filtered off, washed once with a 1:1 mixture of methanol and sulfuric acid, and then was slurried in aqueous ammonia. The product was filtered off and dried to give 7.0 g. 5,12-dihydro-5,12-diethylquinoxalo[2,3-b]phenazine assaying 79.0%, an assay yield of 32.5%.

EXAMPLE 10

The process described in Example 9 was repeated except that only 0.5 g. (0.005 mole) sulfuric acid in 40 ml. water was used to effect ring closure and the reaction time in the ring closure was 5.5 hours at reflux. The yield of 5,12 - dihydro-5,12-diethylquinoxalo[2,3-b] phenazine assaying 79.6% was 8.0 g., a 37.4% assay yield.

EXAMPLE 11

To a solution of 136 g. (1.0 mole) N-ethyl-o-phenylenediamine in 400 ml. (325 g.) methanol cooled to 0–5° C. was added 54 g. (0.50 mole) p-benzoquinone at 0–5° C. over a period of 15 minutes. The mixture was stirred 30 minutes at 0–5° C. and another 54 g. portion of p-benzoquinone was added as before. After the thirty minute stirring period, a third 54 g. portion of p-benzoquinone was added and the mixture was stirred for 21 hours at 0–5° C. Then 400 g. of 50% sulfuric acid was added at less than 30° C., and the mixture was heated to reflux (75° C.). Refluxing was continued for two hours, and then the mixture was cooled to 0–5° C. and stirred at this temperature for 30 minutes. The mixture was filtered. The cake was pulled as dry as possible and then was slurried in a mixture of 400 g. of 50% aqueous sulfuric acid and 400 ml. (325 g.) of methanol. This mixture was heated to 70° C., cooled to 0° C., filtered and washed with a cold mixture of 50 ml. (41 g.) methanol and 50 g. 50% sulfuric acid. The cake, after pulling as dry as possible was slurried in 600 g. of water, and 28% aqueous ammonia was added until the pH was 9. The mixture was filtered. The cake was reslurried once in aqueous ammonia at a pH of 10, filtered, washed with one liter of aqueous ammonia at a pH of 10 and dried at 50° C. The yield was 69.0 g. of product assaying 92.4%, which is 63.8 g. on a 100% basis, 37.5% of the theoretical amount of 170 g.

EXAMPLE 12

The process of Example 9 is repeated except using a mixture of 0.5 mole N-ethyl-o-phenylenediamine and 0.5 mole N-methyl-o-phenylenediamine to obtain a product believed to contain a mixture of 5,12-diethylfluorindine, 5-methyl-12-ethylfluorindine and 5,12-dimethylfluorindine. Thin film chromatography is useful to show the presence of the components of the product.

EXAMPLE 13

The use of N-(β-hydroxyethyl)-o-phenylenediamine in the process of Example 9 yields 5,12-di(β-hydroxyethyl)-fluorindine in good yield.

EXAMPLE 14

The use of 4-nitro-1-N-methyl-o-phenylenediamine in the process of Example 9 yields 5,12-dimethyl-2,9-dinitrofluorindine in good yield.

EXAMPLE 15

The use of 4-N-ethyl-3,4-diaminoanisole in the process of Example 9 yields 2,9-dimethoxy-5,12-diethylfluorindine in satisfactory yield.

The compounds of all of the above examples give fast blue shades when used for dyeing acrylonitrile polymer fibers.

The 5,12 - dialkylfluorindines, prepared as described above, can be quaternized in a well-known manner, as illustrated below, to obtain quaternary compounds also very useful as dyes for acrylic polymer textile materials.

EXAMPLE 16

9.6 g. of the product of Example 9 and 86.7 g. of toluene were charged to a 300 ml. three-necked flask equipped with a stirrer, thermometer, Dean-Stark trap, and condenser. Due to a small concentration of water in the starting material, the temperature of the reaction mixture was raised until all the water had been distilled off as an azeotropic mixture with toluene. When all the water had been removed, the temperature of the reaction mixture was readjusted to 85–90° C., and 13.3 g. dimethyl sulfate was added over a fifteen-minute period through a dropping funnel, maintaining the 85–90° C. temperature throughout. Upon completion of the addition of dimethyl sulfate, the reaction mixture was heated with stirring for an additional fifteen minutes at 85–90° C. Isopropanol 39.3 g. and 6.0 g. water were added to the reaction flask, immediately following the completion of the heating period. The solution was brought to a light reflux and held at reflux for a fifteen-minute period. The reaction mixture was cooled slowly to 10° C., filtered, washed with 100 ml. toluene, and dried in the 60° C. oven. The quaternary compound obtained dyed acrylic fibers to fast blue shades.

The invention has been described in considerable detail with particular reference to certain preferred embodiments thereof, but it will be understood that variations and modifications can be effected within the spirit and scope of the invention as described hereinabove.

We claim:
1. A process for preparing a 5,12-dialkylfluorindine having the formula

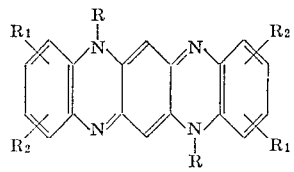

wherein R represents lower alkyl or lower alkyl substituted with hydroxy, chlorine, bromine, cyano or lower alkylamino and $R_1$ and $R_2$ taken singly are the same or different and each represents hydrogen, lower alkyl, lower alkoxy, lower alkylsulfonyl, carbamoyl, chlorine, bromine, hydroxyl, nitro, cyano, sulfamoyl, or lower alkylsulfonamido or $R_1$ and $R_2$ taken collectively represent —CH=CH—CH=CH—, which comprises (a) reacting an o-phenylenediamine having the formula

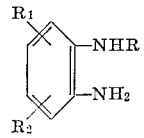

with p-benzoquinone at a temperature of about —20° to about 85° C. in an initial proportion of 1 mole of the o-phenylenediamine to about 1.375 to about 2.5 mole of p-benzoquinone to form a 2,5-dianilino-p-benzoquinone, and (b) contacting the 2,5-dianilino-p-benzoquinone at a temperature of about —20° to about 200° C. with an acid catalyst.

2. A process according to claim 1 wherein the process is carried out in the presence of an alcoholic solvent.

3. A process according to claim 2 wherein the 2,5-dianilino-p-benzoquinone is contacted, at a temperature of about 60° to about 120° C., with a catalytic amount of an acid having a pKa of less than 10.

4. A process according to claim 3 wherein R represents lower alkyl.

5. A process according to claim 4 wherein the phenylenediamine is reacted with p-benzoquinone at a temperature of about 0° to about 30° C. in the presence of an alcohol having up to about 3 carbon atoms in an initial proportion of 1 mole of the o-phenylenediamine to about 1.5 mole p-benzoquinone.

6. A process according to claim 5 wherein $R_1$ and $R_2$ represent hydrogen and the 2,5-dianilino-p-benzoquinone is contacted with an excess of sulfuric, hydrochloric, or acetic acid based on the equivalency of the acid and the o-phenylenediamine reactant.

7. A process for preparing a 5,12-dialkylfluorindine having the formula

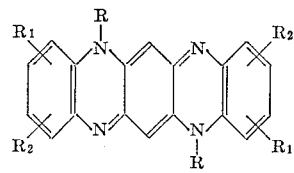

wherein R represents lower alkyl or lower alkyl substituted with hydroxy, chlorine, bromine, cyano or lower alkylamino and $R_1$ and $R_2$ taken singly are the same or different and each represents hydrogen, lower alkyl, lower alkoxy, lower alkylsulfonyl, carbamoyl, chlorine, bromine, hydroxyl, nitro, cyano, sulfamoyl, or lower alkylsulfonamido or $R_1$ and $R_2$ taken collectively represent —CH=CH—CH=CH— which comprises contacting a 2,5-dianilino-p-benzoquinone having the formula

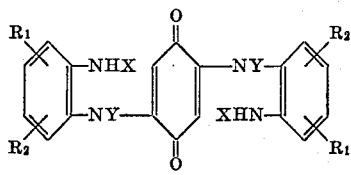

wherein $R_1$ and $R_2$ are defined above and X and Y are different and represent hydrogen or R, with an acid having a pKa of less than 10 at a temperature of about —20° to about 200° C.

8. A process according to claim 7 wherein the process is conducted at a temperature of about 60° to about 120° C. in the presence of a alcoholic solvent.

9. A process according to claim 8 wherein R represents lower alkyl, $R_1$ and $R_2$ represent hydrogen, the alcohol contains up to about 3 carbon atoms and the acid is present in an amount which, on an equivalency basis, is in excess of the o-pheylenediamine reactant.

10. A process according to claim 9 wherein the acid is sulfuric acid, hydrochloric acid, or acetic acid.

References Cited

UNITED STATES PATENTS 3,047,575  7/1962  Boyle et al. _____ 260—267

OTHER REFERENCES

Berichte 27, pp. 33–48 (1894).

ALEX MAZEL, Primary Examiner
A. M. T. TIGHE, Assistant Examiner

U.S. Cl. X.R.

260—239.7, 266, 396